W. B. LASKEY.
MACHINE AND METHOD FOR MAKING CANDY.
APPLICATION FILED OCT. 19, 1920.

1,393,144.

Patented Oct. 11, 1921.

INVENTOR:
William B. Laskey
by Macleod Calver Copeland & Dike
Attys.

UNITED STATES PATENT OFFICE.

WILLIAM B. LASKEY, OF MARBLEHEAD, MASSACHUSETTS.

MACHINE AND METHOD FOR MAKING CANDY.

1,393,144. Specification of Letters Patent. Patented Oct. 11, 1921.

Application filed October 19, 1920. Serial No. 417,986.

*To all whom it may concern:*

Be it known that I, WILLIAM B. LASKEY, a citizen of the United States, residing at Marblehead, county of Essex, State of Massachusetts, have invented a certain new and useful Improvement in Machines and Methods for Making Candy, of which the following is a specification, reference being had therein to the accompanying drawings.

The invention relates to a new and useful improvement in method and machine for forming pulled candy. The invention has especial reference to pulled candy in which a large mass of pulled candy in its softened state is drawn down from a column of relatively large cross-sectional area into attenuated form. When the candy is being drawn down to its intended diameter, the feed of the forward or drawndown portion must be at a much greater speed than the travel of the larger column of candy which is being drawn down. There is a tendency on account of the increase in speed of the travel of the attenuated portion to break it away from the portion which has not yet been brought down to the small size. The object of the present invention is to provide means whereby the strip will be quickly cooled as soon as it reaches the predetermined size, thereby stiffening the column or strip at this point and rendering it less liable to break away from the larger column. The sudden chilling also stops any further reduction in size, and renders the portion of the candy which has been chilled much stronger than that which has not been chilled even though the unchilled portion of the column is of much greater diameter than the chilled portion.

The invention consists substantially in subjecting the strip to a quick cooling process as soon as it reaches its predetermined cross-section, any desired variation in the size of the cross-section being produced by changing the speed of the pulling. The preferable method of thus cooling the strip is by subjecting it to a blast of cold air.

Another important feature of the invention resides in the fact that the pulling-down apparatus engages only that portion of the candy which has been strengthened by chilling.

The invention will be fully understood from the following description when taken in connection with the accompanying drawings, and the novel features thereof will be pointed out and clearly defined in the claims at the close of this specification.

In the drawings, Figure 1 is a side elevation of apparatus by which the invention is practised, in which the strip of candy travels in a substantially horizontal path.

Figure 1:
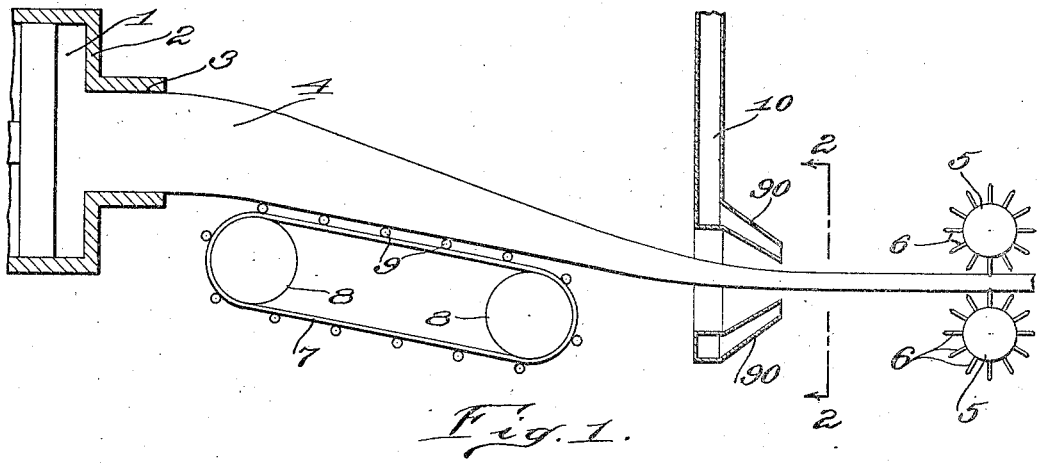

Referring now to the drawings, 1 represents a mass of softened candy within a suitable container 2 having an outlet discharge passage 3 through which the candy is forced in the form of a column 4 which is gradually reduced in size by the drawing process and is finally, in its reduced size, passed between the rotary pulling members 5, 5. The said pulling members 5, 5 are spaced apart from each other sufficiently so as to allow the passage of the strip or ribbon of candy in its attenuated form between said feed wheels which have teeth or blades 6 which engage with the strip of candy to draw the strip. These feed wheels are driven at a much greater rate of speed than the speed of the discharge of the column 4 from the container 1, so that the column of candy will be gradually drawn down from the larger cross-section to the smaller cross-section.

Preferably, when the apparatus is arranged for a horizontal feed, or substantially so, in order to prevent the larger column of candy from sagging, it has an underneath support for a considerable portion of its length between the point where it leaves the container 2 and the point where it reaches its final attenuated form. The means shown for thus supporting the candy consists of a traveling belt 7 running over the pulleys 8, 8 which rotate in a direction to cause the belt to travel in the same direction as the column of candy. The belt 7 is provided with a series of cross strips 9 which furnish bearings for the candy instead of having the candy rest directly on the surface of the belt. In order to prevent the candy from sticking to the support, the belt should travel faster than the column of candy which is supported by it.

At the point when the strip of candy has been drawn down to the size desired, it is subjected to a quick cooling treatment which stiffens it to such a degree that it will no longer stretch and therefore will maintain a uniform size. The preferred cooling means consists of a blast of cold air. It is preferable to apply the cold blast simultaneously to the strip on all sides so that it will be uniformly cooled about its periphery. In the preferable method of doing this, the strip is caused to pass between a plurality of cold air jets which strike the strip of candy at different points in the periphery. In the form of apparatus shown, there are provided four nozzles 90 at 90° apart, which lead from a chamber 10 through which a cold air blast passes, and these nozzles are disposed in such manner that they converge toward each other and to the strip of candy in the direction of the travel of the strip, so that the blast will strike the strip of candy at an angle and therefore spread over a considerable length of strip.

Figure 3:
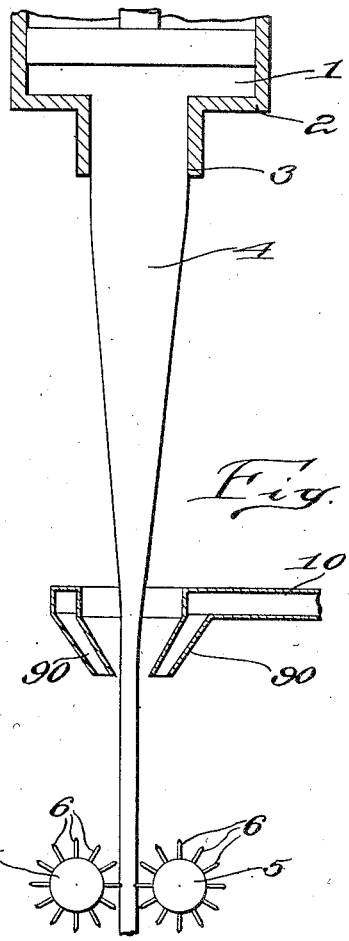
Fig. 3 is a side elevation showing the apparatus arranged vertically.
Figure 2:
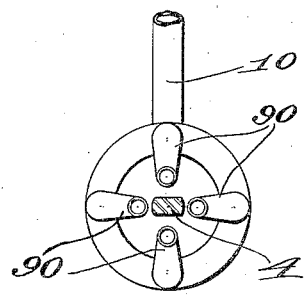
Fig. 2 is a section on line 2—2 of Fig. 1.

When the apparatus is disposed in vertical position, as shown in Fig. 3, the supporting belt shown in Fig. 1 may be omitted, otherwise the apparatus is the same as in Fig. 1.

What I claim is—

1. The method of forming candy which consists in pulling down warm pulled candy and stopping the reduction in size by chilling it.

2. The method of fixing the size of a strip of candy which consists in chilling it at a predetermined point in its length while it is being subjected to tension to reduce its size.

3. The method of producing a strip of candy of uniform size which consists in chilling it at a predetermined point in its length while it is being subjected to tension to reduce its size by a force applied to the portion of the candy which has already been chilled.

4. The method of forming strips of pulled candy of uniform diameter consisting of drawing down a mass of pulled candy while in its warm plastic state into a strip of the desired size, and chilling it at about the point in its travel when it reaches the minimum size desired.

5. The process of treating pulled candy which is being drawn down from a plastic mass to a strip form of uniform size, consisting of chilling the strip at the point in the drawing-down process when it has reached its desired minimum size.

6. An apparatus for forming strips of pulled candy comprising a container for a mass of pulled candy in a plastic state, having a discharge orifice for a stream of the candy, gripping and drawing means located at some distance from the container and which grip the stream of candy and draw it down to the desired size, and means for applying a cold blast to the strip of candy at a point intermediate the draw mechanism and the container.

In testimony whereof I affix my signature.

WILLIAM B. LASKEY.